(12) United States Patent
Kang et al.

(10) Patent No.: US 8,503,422 B2
(45) Date of Patent: Aug. 6, 2013

(54) METHOD AND APPARATUS FOR TRANSMITTING PAGING CONTROL INFORMATION IN A WIRELESS COMMUNICATION SYSTEM

(75) Inventors: Hyun-Jeong Kang, Seoul (KR); Rakesh Taori, Suwon-si (KR); Yeong-Moon Son, Yongin-si (KR); Hyun-Kyu Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 12/821,768

(22) Filed: Jun. 23, 2010

(65) Prior Publication Data

US 2010/0329201 A1    Dec. 30, 2010

(30) Foreign Application Priority Data

| | | | |
|---|---|---|---|
| Jun. 24, 2009 | (KR) | ........................ | 10-2009-0056613 |
| Jun. 29, 2009 | (KR) | ........................ | 10-2009-0058612 |
| Jul. 7, 2009 | (KR) | ........................ | 10-2009-0061677 |
| Sep. 16, 2009 | (KR) | ........................ | 10-2009-0087343 |

(51) Int. Cl.
   *H04J 3/00*     (2006.01)
(52) U.S. Cl.
   USPC ........................ 370/345; 370/465

(58) Field of Classification Search
   None
   See application file for complete search history.

(56) References Cited

U.S. PATENT DOCUMENTS

| | | | | |
|---|---|---|---|---|
| 7,471,942 | B2 * | 12/2008 | Subramanian et al. | .... 455/343.2 |
| 7,630,740 | B2 * | 12/2009 | Kim et al. | ...................... 455/574 |
| 7,822,429 | B2 * | 10/2010 | Kim et al. | ...................... 455/509 |
| 8,185,138 | B2 * | 5/2012 | Chin et al. | ..................... 455/458 |
| 2006/0089161 | A1 | 4/2006 | Kim et al. | |
| 2007/0087767 | A1 | 4/2007 | Pareek et al. | |
| 2009/0209273 | A1 * | 8/2009 | Ha et al. | ......................... 455/458 |
| 2009/0303953 | A1 * | 12/2009 | Kang et al. | .................... 370/329 |
| 2010/0173651 | A1 * | 7/2010 | Park et al. | ...................... 455/458 |
| 2011/0051668 | A1 * | 3/2011 | Lee et al. | ....................... 370/328 |

FOREIGN PATENT DOCUMENTS

| | | |
|---|---|---|
| WO | 2009/148275 A2 | 12/2009 |
| WO | 2010/002222 A2 | 1/2010 |

* cited by examiner

*Primary Examiner* — Kevin C Harper
(74) *Attorney, Agent, or Firm* — Jefferson IP Law, LLP

(57) ABSTRACT

A method and apparatus for transmitting paging control information in a wireless communication system are provided. A method of operating a Base Station (BS) for paging in a superframe-based wireless communication system includes determining a paging listening interval, determining an interval of at least one or more subframes before the paging listening interval, as a paging control listening interval, and, during the paging control listening interval, broadcasting a paging control message.

36 Claims, 9 Drawing Sheets

METHOD AND APPARATUS FOR TRANSMITTING PAGING CONTROL INFORMATION IN A WIRELESS COMMUNICATION SYSTEM

PRIORITY

This application claims the benefit under 35 U.S.C. §119 (a) of a Korean patent application filed in the Korean Intellectual Property Office on Jun. 24, 2009 and assigned Serial No. 10-2009-0056613, of a Korean patent application filed in the Korean Intellectual Property Office on Jun. 29, 2009 and assigned Serial No. 10-2009-0058612, of a Korean patent application filed in the Korean Intellectual Property Office on Jul. 7, 2009 and assigned Serial No. 10-2009-0061677, and a of Korean patent application filed in the Korean Intellectual Property Office on Sep. 16, 2009 and assigned Serial No. 10-2009-0087343, the entire disclosures of all of which are hereby incorporated by reference.

BACKGROUND OF THE INVENTION

1. Field of the Invention

The present invention relates to a wireless communication system. More particularly, the present invention relates to a method and apparatus for transmitting paging control information in a superframe-based wireless communication system.

2. Description of the Related Art

In the 4th Generation (4G) communication system, which is the next generation communication system, research and commercialization are being conducted to provide users with services having various Qualities-of-Service (QoSs) at a data rate of about 100 Mbps. In particular, an intensive study of the 4G communication system is now made to support high-speed services in the way of guaranteeing mobility and QoS for a Broadband Wireless Access (BWA) communication system such as wireless Local Area Network (LAN) system and wireless Metropolitan Area Network (MAN) system. A typical 4G communication system is an Institute of Electrical and Electronics Engineers (IEEE) 802.16 communication system.

According to the IEEE 802.16 communication system standard, in case that there is no traffic to be transmitted/received during a constant time, a Mobile Station (MS) operates in an idle mode to minimize power consumption. In detail, in case that there is no traffic to be transmitted/received, the MS sends a De-REGistration REQuest (DREG-REQ) message to a serving BS, with which the MS is currently in communication, in order to operate in the idle mode. The serving BS receiving the DREG-REQ message sends the MS a De-REGistration Command (DREG-CMD) message to permit the MS to transition into the idle mode.

The DREG-CMD message includes a paging information Type/Length/Value (TLV) field. The paging information TLV field includes a paging group IDentifier (ID), a paging cycle and a paging offset.

The paging group ID is an identifier for identifying a paging group. The paging group is composed of a plurality of cells. The paging cycle is determined with reference to a paging cycle request sent by the MS. The paging offset is a parameter used when a time point capable of paging a specific MS using a frame number and the paging cycle is determined.

The MS awakes from the idle mode at a time point indicated by the paging offset, receives paging control information (e.g., the paging group ID and a paging indicator) during a paging listening interval, and receives a paging message using the received paging control information.

At present, the IEEE 802.16e standard defines a technology for transmitting paging control information in the idle mode. The technology for transmitting the paging control information may also be applied to an IEEE 802.16m system, which is an evolution of the IEEE 802.16e system. However, unlike the IEEE 802.16e system that operates on a frame by frame basis, the IEEE 802.16m system operates on a superframe by superframe basis composed of several frames, and transmits SuperFrame Header (SFH) information based on the superframe. Thus, there is a need for a method and apparatus for transmitting paging control information considering the superframe of the IEEE 802.16m system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for transmitting paging control information through a separate SuperFrame Header (SFH) in a superframe-based wireless communication system.

Another aspect of the present invention is to provide a method and apparatus for configuring paging control information in a superframe-based wireless communication system.

The above aspects are achieved by providing a method and apparatus for transmitting paging control information in a wireless communication system.

In accordance with an aspect of the present invention, a method of operating a Base Station (BS) for paging in a superframe-based wireless communication system is provided. The method includes determining a paging listening interval, determining an interval of at least one or more subframes before the paging listening interval, as a paging control listening interval, and broadcasting a paging control message during the paging control listening interval.

In accordance with another aspect of the present invention, a method of operating a Mobile Station (MS) for paging in a superframe-based wireless communication system is provided. The method includes determining a paging listening interval, determining an interval of at least one or more subframes before the paging listening interval, as a paging control listening interval, and, during the paging control listening interval, receiving a paging control message.

In accordance with a further aspect of the present invention, a BS apparatus for paging in a superframe-based wireless communication system is provided. The apparatus includes a controller and a transmitter. The controller determines a paging listening interval, and determines an interval of at least one or more subframes before the paging listening interval, as a paging control listening interval. The transmitter broadcasts a paging control message during the paging control listening interval.

In accordance with yet another aspect of the present invention, an MS apparatus for paging in a superframe-based wireless communication system is provided. The apparatus includes a controller and a receiver. The controller determines a paging listening interval, and determines an interval of at least one or more subframes before the paging listening interval, as a paging control listening interval. The receiver receives a paging control message during the paging control listening interval.

In accordance with still another aspect of the present invention, a method of operating a BS for paging in a superframe-based wireless communication system is provided. The method includes determining a paging listening interval, generating paging control information in a region predefined in a superframe corresponding to the paging listening interval, and broadcasting the paging control information in the paging listening interval. The generating of the paging control information in the region predefined in the superframe corresponding to the paging listening interval generates the paging control information after a Primary SuperFrame Header (P-SFH) transmitted in a first subframe of the superframe corresponding to the paging listening interval, a Secondary-SFH (S-SFH), and a burst allocation information region, or generates the paging control information within burst allocation information after the SFH transmitted in the first subframe of the superframe corresponding to the listening interval.

In accordance with still another aspect of the present invention, a method of operating an MS for paging in a superframe-based wireless communication system is provided. The method includes determining a paging listening interval, and receiving paging control information in a region predefined in a superframe corresponding to the paging listening interval. The receiving of the paging control information in the region predefined in the superframe corresponding to the paging listening interval receives the paging control information after a P-SFH transmitted in a first subframe of the superframe corresponding to the paging listening interval, an S-SFH, and a burst allocation information region, or receives the paging control information within burst allocation information after the SFH transmitted in the first subframe of the superframe corresponding to the paging listening interval.

In accordance with still another aspect of the present invention, a method of operating a BS for transmitting paging control information and a paging message in a superframe-based wireless communication system is provided. The method includes determining whether to transmit a paging control message and a paging message in the same subframe, generating an indicator indicating if the paging control message and the paging message are transmitted in the same subframe, and transmitting the paging control message and the paging message together with the indicator.

In accordance with still another aspect of the present invention, a method of operating an MS for transmitting paging control information and a paging message in a superframe-based wireless communication system is provided. The method includes receiving a paging control message and a paging message together with an indicator indicating if the paging control message and the paging message are transmitted in the same subframe, and extracting the paging control message and the paging message according to the indicator.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary methods and apparatuses for transmitting paging control information in a superframe-based wireless communication system (e.g., an Institute of Electrical and Electronics Engineers (IEEE) 802.16m system) according to the present invention are described below.

Figure 1:
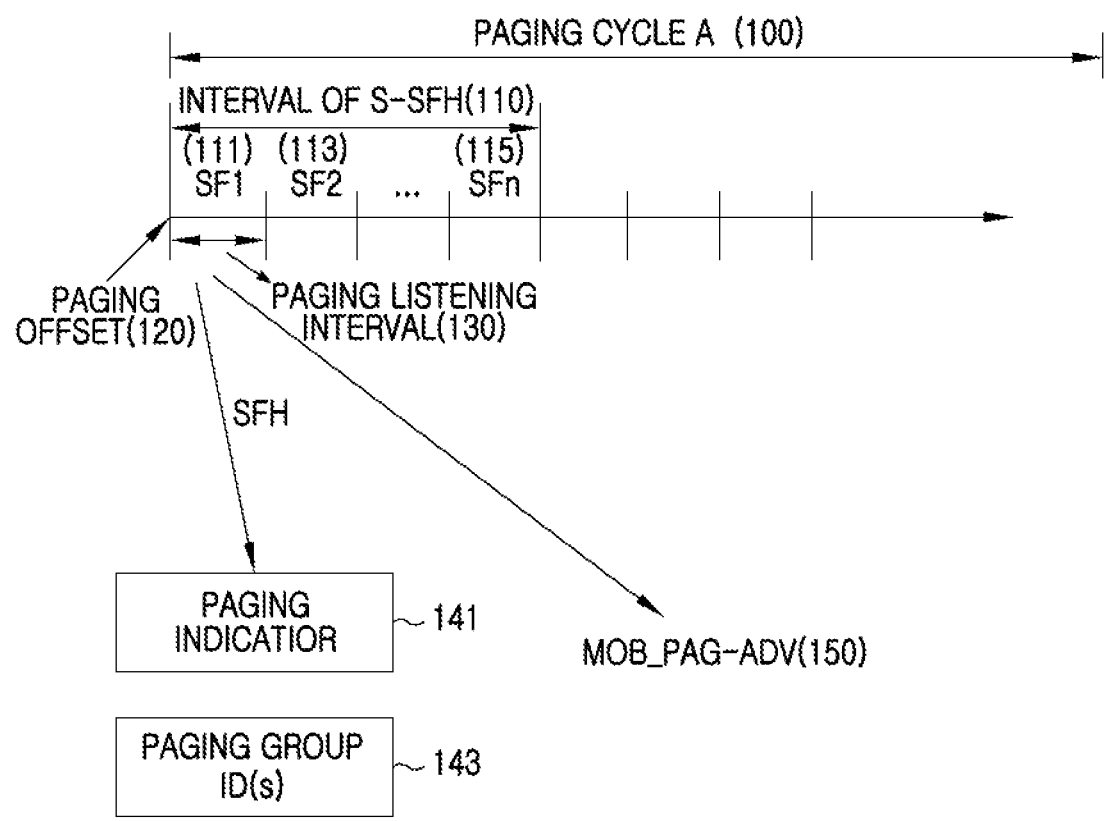
FIG. 1 is a diagram illustrating transmission of paging control information on a superframe basis according to an exemplary embodiment of the present invention.

FIG. 1 is a diagram illustrating transmission of paging control information on a superframe basis according to an exemplary embodiment of the present invention.

Referring to FIG. 1, a paging related parameter includes a paging cycle 100, a paging offset 120, and a paging listening interval 130. The paging cycle 100 has a length of a plurality of SuperFrames (SFs) corresponding to either a transmission interval of Secondary SuperFrame Header (S-SFH) information (Interval of S-SFH) 110 or an integer multiple of a Primary SuperFrame Header (P-SFH). Here, the S-SFH information transmission interval 110 represents a time necessary for receiving S-SFH information among information necessary for an MS to carry out communication service in a system. In the example of FIG. 1, the S-SFH information transmission interval 110 is comprised of 'n' number of SFs (i.e., an SF1 111, an SF2 113, . . . , an SFn 115). Thus, the S-SFH information is divided and transmitted in one or more SFs. Therefore, the time of the S-SFH information transmission interval 110 is necessary for the MS to receive the S-SFH information. The paging offset 120 indicates the starting time of the paging listening interval 130 in the paging cycle 100. By setting the length of the paging cycle 100 and paging offset 120 on the basis of the S-SFH information transmission interval 110, a time for which the MS, which has failed to previously secure the S-SFH information, waits to receive the S-SFH information can be optimized. In more detail, in case that the MS does not receive the S-SFH information in advance, the MS has to separately receive the S-SFH information to access the system. Therefore, if the MS is in an awake state in the middle of the S-SFH information transmission interval (Interval of S-SFH) 110, it may occur that the MS must wait until the starting time of the next S-SFH information transmission interval 110 and then receive S-SFH information. Thus, by corresponding an awake time point (i.e., the paging offset 120) of the MS with a starting point of the S-SFH information transmission interval 110, the MS can minimize the waiting time even in case the MS has to separately receive the S-SFH information.

In an exemplary implementation, a value of the paging offset 120 may be set to one of a ½ multiple interval of the S-SFH information transmission interval 110, a ⅓ multiple interval, and a ¼ multiple interval. The value of the paging offset 120 can be acquired through De-REGgistration REQuest/Command (DREG-REQ/CMD) messages exchanged between the MS and a BS for the MS to enter the idle mode.

The paging listening interval 130 may be one or more superframes. During the paging listening interval 130, the MS can receive a MOBile PAGing ADVertisement (MOB_PAG-ADV) message 150 from the BS. Through the MOB_PAG-ADV message 150, a network entry or location update procedure may be performed. Also, paging control information transmitted in the superframe of the paging listening interval 130 may include a paging indicator 141 and a paging group IDentifier (ID) 143. The paging indicator 141 indicates whether the MOB_PAG-ADV message 150 exists within the paging listening interval 130.

Here, the paging indicator 141 may be expressed with 1 bit and indicates whether at least one MOB_PAG-ADV message 150 is transmitted during the paging listening interval 130. In more detail, in case that a bit value of the paging indicator 141 is equal to '0', the paging indicator 141 indicates that the MOB_PAG-ADV message 150 is not transmitted during the paging listening interval 130 and, in case that the bit value is equal to '1', the paging indicator 141 indicates that the MOB_PAG-ADV message 150 is transmitted during the paging listening interval 130. Or, the paging indicator 141 can be used for indicating the length of the paging listening interval 130 besides indicating the existence or non-existence of the MOB_PAG-ADV message 150 within the paging listening interval 130. At this time, the paging indicator 141 may be expressed with 3 bits. Among the 3 bits, a first bit can be used for indicating the existence or non-existence of the MOB_PAG-ADV message 150 and the remaining two bits can be used for indicating the length of the paging listening interval 130. For example, in case that the first bit of the paging indicator 141 is equal to '0', the first bit represents the non-existence of the MOB_PAG-ADV message 150, and the remaining two bits are set to '00'. In case that the first bit of the paging indicator 141 is equal to '1', the first bit can represent the existence of the MOB_PAG-ADV message 150, and the remaining two bits can represent the length of the paging listening interval 130 for transmitting the MOB_PAG-ADV message 150. For example, in case that the first bit of the paging indicator 141 is equal to '1' and the remaining two bits are set to '00', the remaining two bits can represent that the length of the paging listening interval 130 is equal to 1 frame. For another example, in case that the first bit of the paging indicator 141 is equal to '1' and the remaining two bits are set to '10', the remaining two bits can represent that the length of the paging listening interval 130 is equal to 3 frames.

The paging group ID 143 represents information on a paging group managed by a BS. By receiving the paging group ID 143 information, the MS can determine a change or non-change of the paging group. Upon transition to an idle mode, the MS becomes aware of a paging group ID inclusive of the MS through a DREG-CMD message received from the BS. In case that the paging group ID 143 received by the MS of the idle mode during the paging listening interval 130 is different from the paging group ID included in the DREG-CMD message, the MS has to acquire paging related information on the paging group in which the MS is currently located, by performing a location update.

The MS receives the paging control information such as the paging indicator 141 and the paging group ID 143 on a superframe basis, and receives the MOB_PAG-ADV message 150 according to the received paging control information. Here, the paging control information is included and transmitted after a P-SFH transmitted in a first subframe of a superframe during the paging listening interval 130, an S-SFH, and burst allocation information (i.e., a MAP Information Element (IE)) of the first subframe. In other words, the paging control information is included in a predefined region of the superframe corresponding to the paging listening interval 130. That is, the paging control information is transmitted through a specific region exclusive of the P-SFH, the S-SFH, and the burst allocation information (i.e., the MAP IE) of the first subframe.

An exemplary method of including the paging control information in the predefined region of the superframe corresponding to the paging listening interval 130 and transmitting the paging control information is described below in more detail with reference to FIG. 2.

Figure 2:
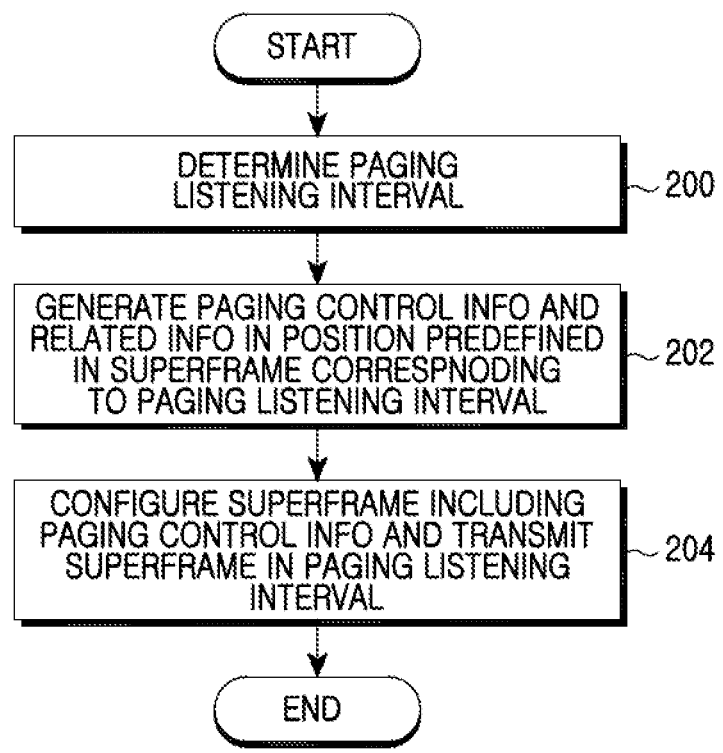
FIG. 2 is a flowchart illustrating an operation of a Base Station (BS) for transmitting paging control information through a separate SuperFrame Header (SFH) in a superframe-based wireless communication system according to an exemplary embodiment of the present invention.

FIG. 2 is a flowchart illustrating an operation of a BS for transmitting paging control information through a separate SFH in a superframe-based wireless communication system according to an exemplary embodiment of the present invention.

Referring to FIG. 2, in step 200, the BS determines a paging listening interval in which a plurality of MSs awake from an idle mode and receive an MOB_PAG-ADV message.

In step 202, the BS generates paging control information and related information in a position or region predefined in a superframe corresponding to the determined paging listening interval.

According to an exemplary embodiment of the present invention, a position or region predefined in a superframe corresponding to a paging listening interval follows a P-SFH transmitted in a first subframe of the superframe corresponding to the paging listening interval, an S-SFH, and burst allocation information (i.e., a MAP IE) of the first subframe. Length information of the paging control information follows the burst allocation information (i.e., the MAP IE). According to the length information of the paging control information, the MS can decode the paging control information. For example, in case that a paging group is expressed with a 16-bit field and the paging group is three in number, 48 bits can be marked in the length information of the paging control information. In case that the paging control information is used to represent a paging indicator for the paging group, 51 (48+3) bits can be marked in the length information of the paging control information. In case that a paging indicator of 1 bit, not the paging indicator for the paging group, is used to represent only if a paging message currently exists in the paging listening interval, 49 (48+1) bits can be marked in the length information of the paging control information. The length information of the paging control information is followed by paging group information, or paging group information and a paging indicator corresponding to the paging group information, or a paging indicator and paging group information corresponding to the paging listening interval.

According to an exemplary implementation, the length information of the paging control information can be replaced with information on the number of paging groups included in the paging control information. In more detail, a value representing that the number of paging groups is three is marked in the length information of the paging control information. After that, corresponding paging group, or paging group information and a paging indicator corresponding to the paging group, or a paging indicator and paging group for a paging listening interval are marked.

The P-SFH transmitted in the first subframe, the S-SFH, and the burst allocation information (i.e., the MAP IE) of the first subframe may cause a failure to transmit the paging control information in the first subframe. In this case, the paging control information follows burst allocation information (i.e., a MAP IE) of a second or arbitrary subframe.

On the other hand, a paging indicator indicating transmission of the paging control information is included in one of the P-SFH, the S-SFH, and control information (i.e., non-user specific control information) of the burst allocation information (i.e., the MAP IE). Also, in case that a paging message is transmitted in the first subframe, the paging message is transmitted after the paging control information.

Information on the paging indicator indicating the transmission of the paging control information included in the P-SFH is shown in Table 1 below.

TABLE 1

| PSH(Primary Superframe Header){ | |
|---|---|
| PGID Info indicator | Indicate whether PGID Info is transmitted |
| } | |

In case that the paging control information is transmitted according to the P-SFH, the paging control information has a structure shown in Table 2 below. The length information of the paging control information and the paging group information can be encoded in a different scheme.

TABLE 2

| Length of PGID Info{ | Paging length info |
|---|---|
|     Number of PGIDs | The number of PGIDs in the PGID Info.(It can be represented with Number of LRUs of PGID Info) |
| } | |
| PGID Info { | Paging group info |
|     Paging group usage flag | Indicate whether paging indicator is applied |
|     While (Number of PGIDs){ | //when Paging group usage flag is set to 0 (paging indicator is not applied) |
|         PGID | paging group identifier |
|     } | |
|     While (Number of PGIDs) { | //when Paging group usage flag is set to 1 (paging indicator is applied) |
|         PGID | Paging group identifier |
|         Paging indicator | Indicate whether Paging message is transmitted for a plurality of MSs in this paging group |
|     } | |
| } | |

According to an exemplary embodiment of the present invention, a separate SFH including paging control information follows a P-SFH transmitted in a first subframe of a superframe corresponding to a paging listening interval, an S-SFH, and burst allocation information (i.e., a MAP IE) of the first subframe. Paging group information, or paging group information and a paging indicator corresponding to the paging group, or a paging indicator and paging group for a paging listening interval are included in a paging control information channel. Unlike this, information on the number of paging groups included in the paging control information or size (i.e., length) information of the paging control information is included in the P-SFH. Thus, from the P-SFH, the MS acquires the information on the number of paging groups or the size information of the paging control information and then, from the separate paging control information channel, the MS acquires the information of the paging group managed by the BS. Also, in case that a paging message is transmitted in the first subframe, the paging message is transmitted after the paging control information. In case that the P-SFH transmitted in the first subframe, the S-SFH, and the burst allocation information (i.e., the MAP IE) of the first subframe cause a failure to transmit the paging control information in the first subframe, the paging control information follows burst allocation information (i.e., a MAP IE) of a second or arbitrary subframe.

The information on the number of paging groups included in the P-SFH or the size information of the paging control information has a structure shown in Table 3 below. The paging control information has a structure shown in Table 4 below.

TABLE 3

| PSH(Primary Superframe Header){ | |
|---|---|
|     Number of PGIDs | The number of PGIDs in the PGID Info. (It can be replaced with Number of LRUs of PGID Info) |
| } | |

TABLE 4

```
PGID Info {
    Paging group usage flag        Indicate whether paging indicator is
                                   applied
    While (Number of PGIDs){       //when Paging group usage flag is set
                                   to 0 (paging indicator is not applied)
        PGID                       paging group identifier
    }
    While (Number of PGIDs)        //when Paging group usage flag is set
    {                              to 1 (paging indicator is applied)
        PGID                       Paging group identifier
        Paging indicator           Indicate whether Paging message is
                                   transmitted for a plurality of MSs in
                                   this paging group
    }
}
```

According to an exemplary embodiment of the present invention, a separate SFH including paging control information can be indicated by burst allocation information (i.e., a MAP IE) of a first subframe located after both a P-SFH transmitted in the first subframe of a superframe corresponding to a paging listening interval and an S-SFH. Control information (i.e., non-user specific control information) of the burst allocation information (i.e., the MAP IE) indicates whether the burst allocation information (i.e., the MAP IE) indicating the paging control information is included in the first subframe. In case that the burst allocation information is included in the first subframe, the burst allocation information is followed by general unicast burst allocation information (i.e., a user specific Advanced (A)-MAP IE). The burst allocation information (i.e., the MAP IE) of the first subframe includes both type information of the paging control information representing the existence of an SFH including the paging control information, and allocation information including the size (i.e., length) information of the paging control information. Here, the type information represents that the paging control information is paging control information including paging group information. The size information represents the number of paging groups included in the paging control information. Or, the size information represents a size of a burst occupied by the paging control information, that is, the number of Logical Radio Units (LRUs).

In case that the P-SFH transmitted in the first subframe, the S-SFH, and the burst allocation information (i.e., the MAP IE) cause a failure to transmit information of an SFH including the paging control information, in the first subframe, the SFH information including the paging control information can be positioned in burst allocation information (i.e., a MAP IE) of a second or arbitrary subframe.

In case that the burst allocation information (i.e., the MAP IE) indicates the paging control information, the paging control information includes paging group information, or paging group information and a paging indicator corresponding to the paging group information, or a paging indicator and paging group information for a paging listening interval. On the basis of the length information of the burst allocation information (i.e., the MAP IE), an MS can determine the number of paging groups included in the paging control information or determine a size of the paging control information. Also, in case that a paging message is transmitted in the first subframe, the paging message is transmitted after the paging control information.

The allocation information of the paging control information included in the burst allocation information (i.e., the MAP IE) has a structure shown in Table 5 below.

TABLE 5

```
Broadcast AMAP-IE {
    Type        Type = PGID Info.
    Length      Number of paging groups or Number
                of LRU or PGID Info.
}
```

The paging control information indicated by the burst allocation information has a structure of Table 4 above or a structure of Table 6 below.

TABLE 6

```
PGID Info {
    Type                           PGID Info
    Paging group usage flag        Indicate whether paging indicator is
                                   applied
    While (Number of PGIDs){       //when Paging group usage flag is set
                                   to 0 (paging indicator is not applied)
        PGID                       paging group identifier
    }
    While (Number of PGIDs)        //when Paging group usage flag is set
    {                              to 1 (paging indicator is applied)
        PGID                       Paging group identifier
        Paging indicator           Indicate whether Paging message is
                                   transmitted for a plurality of MSs in
                                   this paging group
    }
}
```

In step 204, the BS configures the superframe including the generated paging control information and transmits the superframe during a corresponding paging listening interval.

Next, the BS terminates the procedure according to an exemplary embodiment of the present invention.

Figure 3:
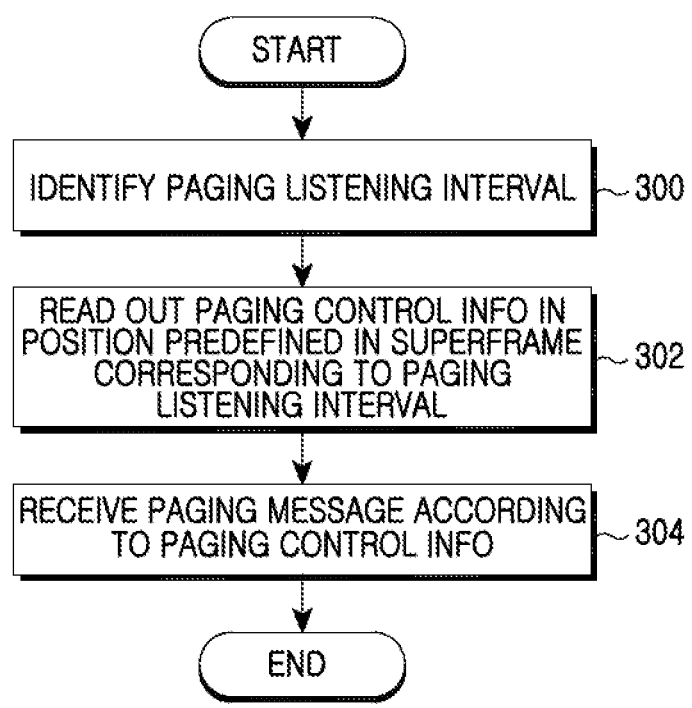
FIG. 3 is a flowchart illustrating an operation of a Mobile Station (MS) for transmitting paging control information through a separate SFH in a superframe-based wireless communication system according to an exemplary embodiment of the present invention.

FIG. 3 is a flowchart illustrating an operation of an MS for transmitting paging control information through a separate SFH in a superframe-based wireless communication system according to an exemplary embodiment of the present invention.

Referring to FIG. 3, in step 300, the MS identifies a paging listening interval. In step 302, the MS reads out paging control information in a position predefined in a superframe corresponding to the paging listening interval.

For example, according to an exemplary embodiment of the present invention, a position or region predefined in a superframe corresponding to a paging listening interval follows a P-SFH transmitted in a first subframe of the superframe corresponding to the paging listening interval, an S-SFH, and burst allocation information (i.e., a MAP IE) of the first subframe.

Thus, according to length information of the paging control information following the burst allocation information (i.e., the MAP IE) (referring to Table 2), the MS decodes the paging control information, and reads out paging group information following the length information of the paging control information, or paging group information and a paging indicator corresponding to the paging group information, or a paging indicator and paging group information corresponding to the paging listening interval.

On the other hand, with reference to the paging indicator indicating transmission of the paging control information included in one of the P-SFH, the S-SFH, and the control information (i.e., the non-user specific control information) of the burst allocation information (i.e., the MAP IE), the MS identifies if both the length information of the paging control information, and the paging indicator and paging group information follow the burst allocation information (i.e., the MAP IE) (referring to Table 1).

According to an exemplary embodiment of the present invention, the MS acquires information on the number of paging groups or size information of paging control information from a P-SFH (referring to Table 3), and acquires paging group information (i.e., information of a paging group managed by the BS) from a separate SFH following a P-SFH transmitted in a first subframe of a superframe corresponding to a paging listening interval, an S-SFH, and burst allocation information (i.e., a MAP IE) of the first subframe (referring to Table 4).

According to an exemplary embodiment of the present invention, the MS decodes paging control information indicated by burst allocation information (i.e., a MAP IE) of a first subframe located after both a P-SFH transmitted in the first subframe of a superframe corresponding to a paging listening interval and an S-SFH. Here, the MS first reads out control information (i.e., non-user specific control information) of the burst allocation information (i.e., the MAP IE) so as to determine inclusion or non-inclusion of the burst allocation information (i.e., the MAP IE) indicating the paging control information. In a region in which the burst allocation information (i.e., the MAP IE) indicates the paging control information exists, there is paging group information, or paging group information and a paging indicator corresponding to the paging group, or a paging indicator and paging group information for the paging listening interval (referring to Tables 5 and 6).

In step 304, the MS receives a paging message according to the read paging control information.

Next, the MS terminates the procedure according to the exemplary embodiment of the present invention.

Figure 4:
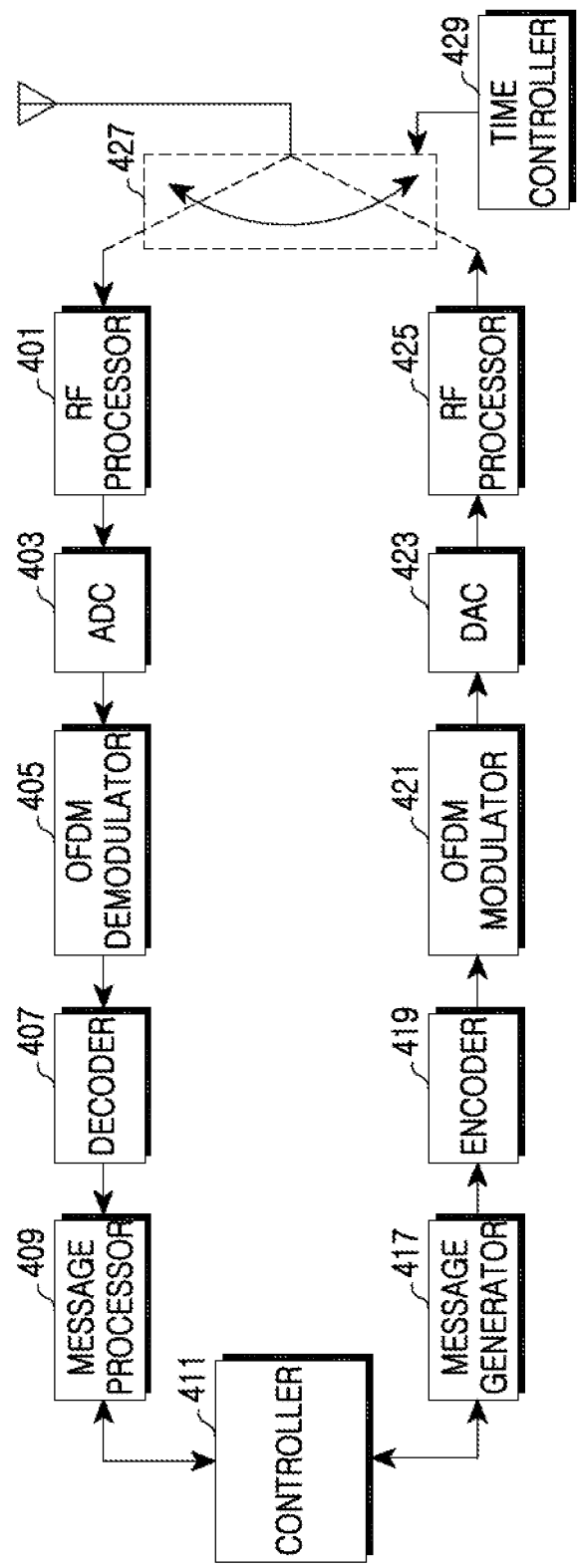
FIG. 4 is a block diagram illustrating a construction of a BS or MS apparatus for transmitting paging control information through a separate SFH in a superframe-based wireless communication system according to an exemplary embodiment of the present invention.

FIG. 4 is a block diagram illustrating a construction of a BS or MS apparatus for transmitting paging control information through a separate SFH in a superframe-based wireless communication system according to an exemplary embodiment of the present invention.

Referring to FIG. 4, an MS (or a BS) includes a Radio Frequency (RF) processor 401, an Analog to Digital Converter (ADC) 403, an Orthogonal Frequency Division Multiplexing (OFDM) demodulator 405, a decoder 407, a message processor 409, a controller 411, a message generator 417, an encoder 419, an OFDM modulator 421, a Digital to Analog Converter (DAC) 423, an RF processor 425, a Time Division Duplex (TDD) switch 427, and a time controller 429.

The time controller 429 controls a switching operation of the TDD switch 427 on the basis of frame synchronization. For example, if it is an interval for receiving a signal, the time controller 429 controls the TDD switch 427 to connect an antenna with the RF processor 401 of a receive end. Also, if it is an interval for transmitting a signal, the time controller controls the TDD switch 427 to connect the antenna with the RF processor 425 of a transmit end.

During the receiving interval, the RF processor 401 converts an RF signal received through the antenna into a baseband analog signal. The ADC 403 converts an analog signal from the RF processor 401 into sample data. The OFDM demodulator 405 processes, by Fast Fourier Transform (FFT), the sample data output from the ADC 403 and outputs frequency domain data. The decoder 407 selects data of subcarriers actually intended for reception among the frequency domain data provided from the OFDM demodulator 405, and processes, by demodulation and decoding, the selected data according to a predefined modulation level (i.e., a Modulation and Coding Scheme (MCS) level). The message processor 409 analyzes a control message input from the decoder 407 and provides the result to the controller 411.

The controller 411 performs a general control of the BS or MS. Also, the controller 411 processes information provided from the message processor 409 and provides the result to the message generator 417.

The message generator 417 generates a message by means of various kinds of information provided from the controller 411 and outputs the message to the encoder 419 of a physical layer. The encoder 419 encodes and modulates data from the message generator 417 according to a predefined modulation level (i.e., an MCS level). The OFDM modulator 421 processes, by Inverse Fast Fourier Transform (IFFT), data from the encoder 419 and outputs sample data (i.e., an OFDM symbol). The DAC 423 converts the sample data into an analog signal. The RF processor 425 converts the analog signal from the DAC 423 into an RF signal and transmits the RF signal through the antenna.

In a description of a BS operation, the controller 411 determines a paging listening interval in which a plurality of MSs awake from an idle mode and receive an MOB_PAG-ADV message. According to an exemplary embodiment, the controller 411 generates paging control information and related information in a position or region predefined in a superframe corresponding to the determined paging listening interval, and transmits the paging control information and related information to the message generator 417. The message generator 417 configures the superframe including the paging control information from the controller 411 and transmits the superframe in the paging listening interval.

In an exemplary MS operation, the controller 411 identifies a paging listening interval. According to an exemplary embodiment, the controller 411 reads out paging control information in a position predefined in a superframe corresponding to the paging listening interval, and receives a paging message according to the read paging control information.

The above description is made of a method to transmit paging control information through a separate channel. In case that both the paging control message and a paging message are transmitted together in a specific subframe, a method to transmit the two messages together can be considered.

Figure 5:
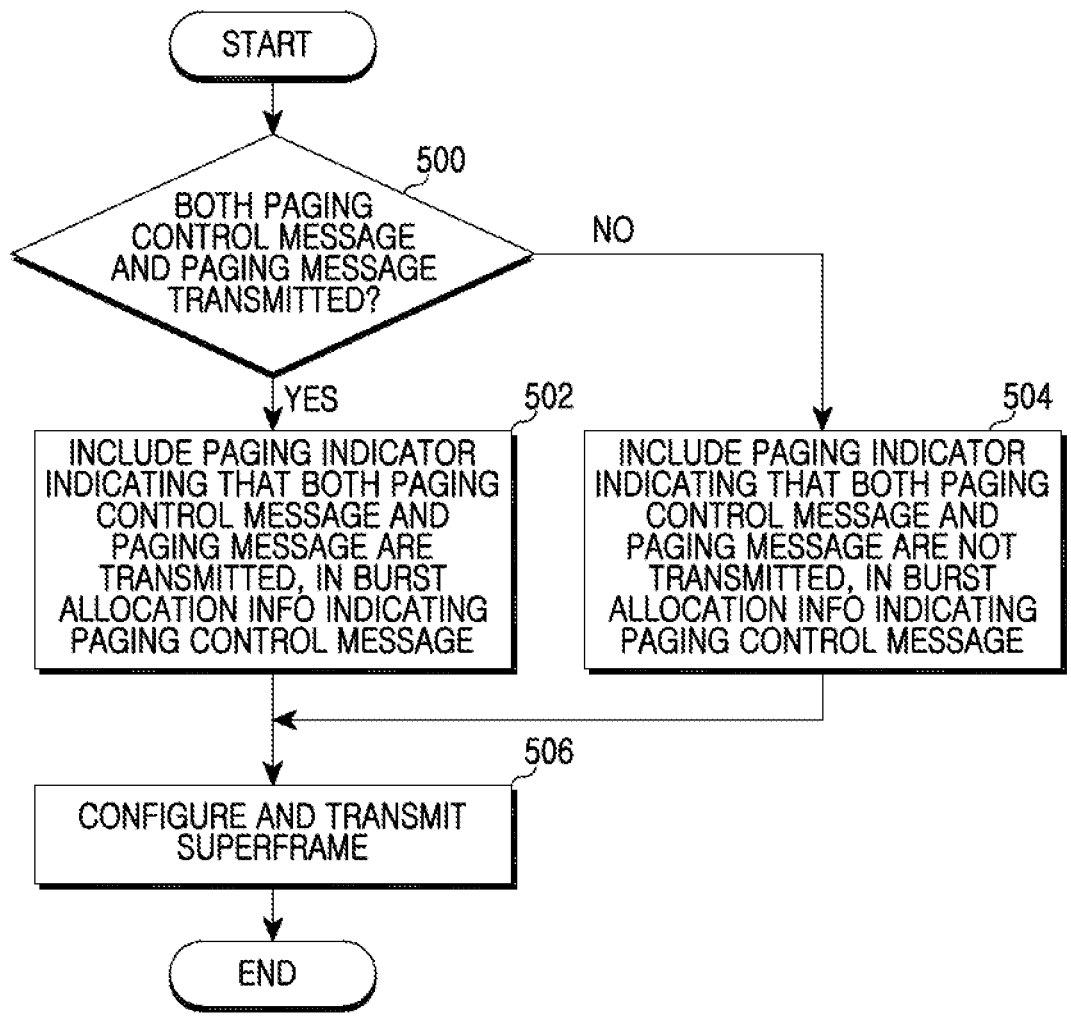
FIG. 5 is a flowchart illustrating an operation of a BS for transmitting a paging control message and a paging message in a superframe-based wireless communication system according to an exemplary embodiment of the present invention.

FIG. 5 is a flowchart illustrating an operation of a BS for transmitting a paging control message and a paging message in a superframe-based wireless communication system according to an exemplary embodiment of the present invention.

Referring to FIG. 5, in step 500, the BS determines if both a paging control message and a paging message are transmitted together. If it is determined that the paging control message and the paging message are transmitted together, the BS proceeds to step 502 and includes, in burst allocation information, a paging indicator indicating simultaneous transmission of the paging control message and the paging message.

On the contrary, if it is determined that the paging control message and the paging message are not transmitted together, the BS proceeds to step 504 and includes, in the burst allocation information, a paging indicator indicating non-simultaneous transmission of the paging control message and the paging message (i.e., transmission of only the paging control message).

For example, the burst allocation information (i.e., the MAP IE) indicating the paging control message of Table 5 is used for representing transmission or non-transmission of the paging control message, but can be extended to include the paging indicator indicating if the paging control message and the paging message are transmitted together. The paging indicator has a value of 1 bit, and indicates transmission of paging information included in the paging message subsequent to the paging control message. In case that the paging indicator included in the burst allocation information (i.e., the MAP IE) indicating the paging control message indicates simultaneous transmission of both the paging control message and the paging message, an MS receives the paging control message according to the burst allocation information (i.e., the MAP IE) and then receives the paging message. In case that the paging indicator included in the burst allocation information (i.e., the MAP IE) indicates transmission of only the paging control information, the MS can receive only the paging control information.

In an exemplary implementation, a way to utilize the burst allocation information (i.e., the MAP IE) indicating the paging message can be considered. In this case, the paging indicator indicating if both the paging control message and the paging message are transmitted together can be included in the burst allocation information (i.e., the MAP IE) indicating the paging message. Even in this case, through the paging indicator included in the burst allocation information (i.e., the MAP IE) of the paging message, an MS determines if both the paging control message and the paging message are transmitted together. In case that the two messages are transmitted together, the MS receives the paging control information and then receives the paging message. In case that the paging indicator indicates that the two messages are not transmitted together, the MS can receive only the paging control information.

A structure including the paging indicator in either the burst allocation information (i.e., the MAP IE) indicating the paging control message or the burst allocation information (i.e., the MAP IE) indicating the paging message is shown in Table 7 below. Also, in case that the paging indicator indicates that both the paging control message and the paging message are transmitted together, the paging control information and a paging advertisement message including paging advertisement information of the paging message is shown in Table 8 below.

TABLE 7

| Broadcast AMAP-IE { | |
|---|---|
| Type | Type = PGID Info. Or Type = PAG-ADV |
| Length | Number of paging groups or Number of LRU or PGID Info. Or Number of LRU of PAG-ADV |
| PAG-ADV following indicator } | Indicate whether PGID Info is followed by PAG-ADV |

TABLE 8

| PAG-ADV Message{ | |
|---|---|
| Type | PAG-ADV |
| PGID Info | Paging group related information block |
| PAG-ADV Info } | Paging advertisement information block |

In step 506, the BS configures and transmits a superframe including the burst allocation information.

Next, the BS terminates the procedure according to the exemplary embodiment of the present invention.

Figure 6:
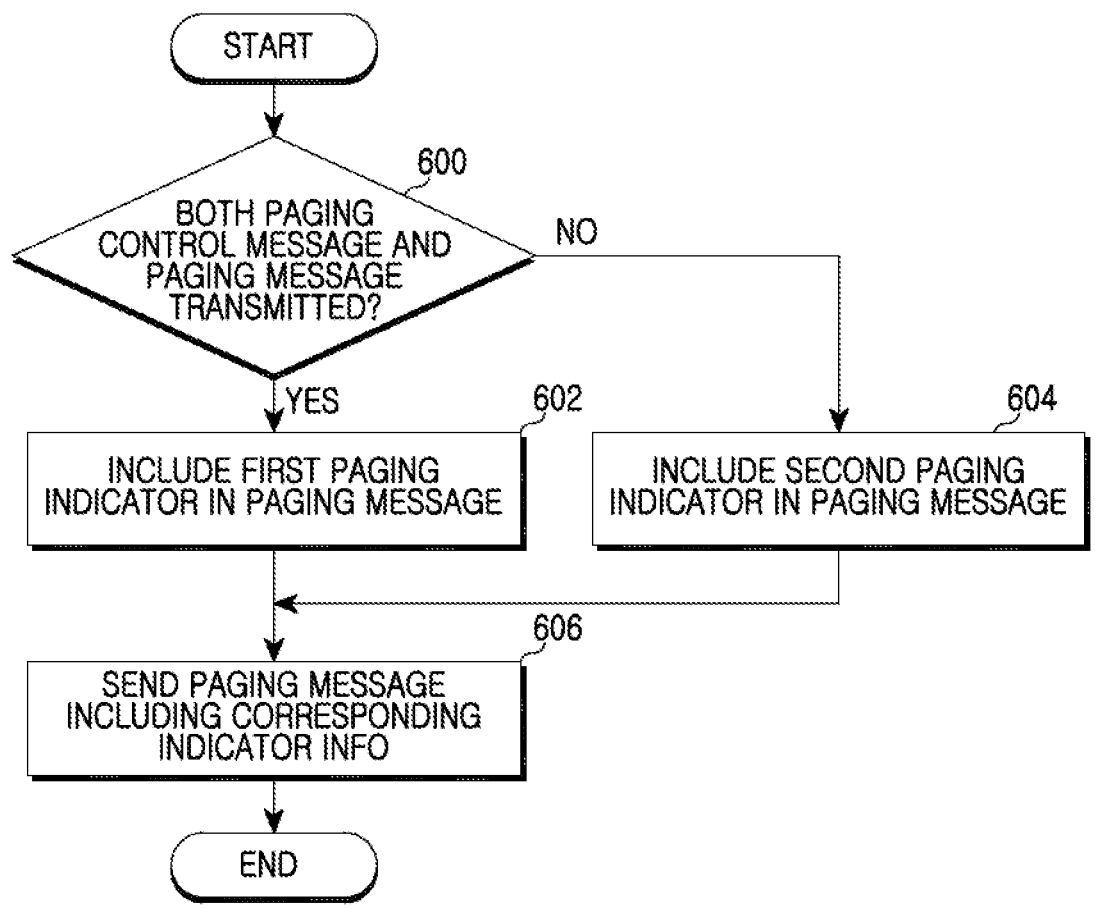
FIG. 6 is a flowchart illustrating an operation of a BS for transmitting a paging control message and a paging message in a superframe-based wireless communication system according to an exemplary embodiment of the present invention.

FIG. 6 is a flowchart illustrating an operation of a BS for transmitting a paging control message and a paging message in a superframe-based wireless communication system according to an exemplary embodiment of the present invention.

Referring to FIG. 6, in step 600, the BS determines if a paging control message and a paging message are transmitted together. If it is determined that the paging control message and the paging message are simultaneously transmitted, the BS proceeds to step 602 and includes, in the paging message, a first paging indicator indicating simultaneous transmission of the paging control message and the paging message.

On the contrary, if it is determined that the paging control message and the paging message are not simultaneously transmitted, the MS proceeds to step 604 and includes, in the paging message, a second paging indicator indicating non-simultaneous transmission of the paging control message and the paging message.

For example, in case that the paging control message and the paging message are transmitted together, the paging message can include the paging indicator indicating that the two messages are transmitted together. At this time, the paging control message and the paging message are transmitted in the first of a superframe corresponding to a paging listening interval of an MS. The paging indicator included in the paging message indicates transmission of the paging message subsequent to the paging control message. In case that the MS recognizes that both the paging control message and the paging message are transmitted together according to the paging indicator, the MS receives the paging control message and receives the paging message. If the paging indicator included in the paging message indicates that both the paging control message and the paging message are not transmitted together, the MS receives only the paging control information.

An exemplary structure of the paging message including the paging indicator indicating simultaneous transmission of both the paging control message and the paging message is shown in Table 9 below.

TABLE 9

| PAG-ADV Message{ | |
|---|---|
| Type | PAG-ADV |
| PAG-ADV following indicator | Indicate whether PGID Info is followed by PAG-ADV |
| PGID Info | Paging group related information block |
| If (PAG-ADV following indicator = = 1){ | |
| PAG-ADV Info } } | Paging advertisement information block |

In step 606, in a paging listening interval, the BS sends the paging message including the corresponding paging indicator information.

Next, the BS terminates the procedure according to the exemplary embodiment of the present invention.

An exemplary method for transmitting a paging control message and a paging message in a superframe-based wireless communication system is a way to utilize a value of a Type field included in the burst allocation information (i.e., the MAP IE) of Table 5. The Type field is used for indicating that a burst indicated in the burst allocation information is the paging control message or the paging message. Here, the Type field value indicating that both the paging control information and the paging message are transmitted together can be separately defined in the burst indicated in the burst allocation information. For example, if it is defined that the Type field value of the paging control information is equal to '0' and the Type field value of the paging message is equal to '1', the Type field value indicating simultaneous transmission of the paging control information and the paging message can be defined to be '2'.

Thus, the BS determines if the paging control information and the paging message are transmitted together. In case that there is a need to simultaneously transmit the paging control information and the paging message, the BS sets the Type field value of the burst allocation information of Table 5 to the Type field value indicating simultaneous transmission of both the paging control information and the paging message including the paging information, and transmits the burst allocation information (i.e., the MAP IE). Upon receiving the burst allocation information (i.e., the MAP IE) including the Type field value indicating simultaneous transmission of both the paging control information and the paging message including paging information, an MS receives the paging message transmitted together with the paging control information according to the indication of the burst allocation information (i.e., the MAP IE).

The above description is made for a case of transmitting the paging control information in the paging listening interval for sending/receiving the paging message. The following description is made for a case of transmitting the paging control information separate from the paging listening interval.

Figure 7:
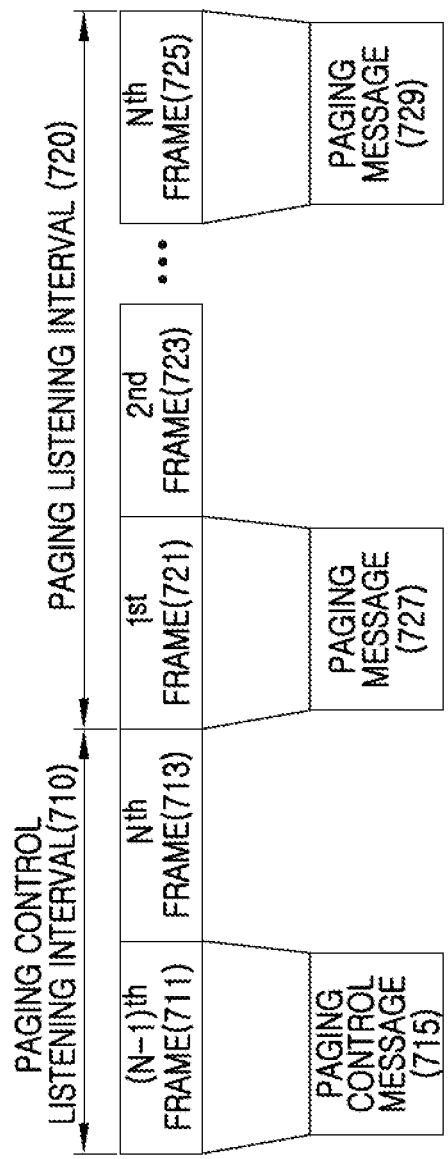
FIG. 7 is a diagram illustrating an example in which paging control information according to an exemplary embodiment of the present invention is transmitted separate from a paging listening interval.

FIG. 7 is a diagram illustrating an example in which a paging control message according to an exemplary embodiment of the present invention is transmitted separate from a paging listening interval.

Referring to FIG. 7, there are a paging control listening interval 710 and a paging listening interval 720. The paging control listening interval 710 corresponds to an interval in which an MS being in an idle mode receives a paging control message. The paging listening interval 720 corresponds to an interval in which the MS receives a paging message. The paging listening interval 720 is determined based on a paging cycle and a paging offset as described in FIG. 1. The paging control listening interval 710 is determined beforehand as a frame value earlier than a superframe corresponding to the paging listening interval 720. That is, in the example of FIG. 7, the paging control listening interval 710 is an interval corresponding to 2 frames earlier than the superframe corresponding to the paging listening interval 720. Or, the paging control listening interval 710 can be determined using the paging cycle and the paging offset, and the paging listening interval 720 can be also determined from a defined frame (i.e., 2 frames) subsequent to the paging control listening interval 710.

An (N-1)$^{th}$ frame 711 and N$^{th}$ frame 713 of the paging control listening interval 710 correspond to an interval in which the idle mode MS receives and processes paging control message 715. A 1$^{st}$ frame 721, a 2$^{nd}$ frame 723, . . . , to an N$^{th}$ frame 725 of the paging listening interval 720 correspond to an interval in which the idle mode MS receives and processes paging messages 727 to 729. In FIG. 7, a length of the paging control listening interval 710 is set to 2 frames, but the length of the paging control listening interval 710 is determined considering a processing time sufficient for the idle mode MS to receive and process the paging control information 715 and, according to the paging control information 715, additionally receive the paging messages 727 to 729 in the paging listening interval 720. Also, in case that a frequency band in which the idle mode MS receives the paging control message 715 is different from a frequency band in which the idle mode MS receives the paging messages 727 to 729, the length of the paging control listening interval 710 is determined considering a time of switching between the two frequency bands.

Exemplary operations of a BS and MS are described below with reference to FIGS. 8 and 9, respectively.

Figure 8:
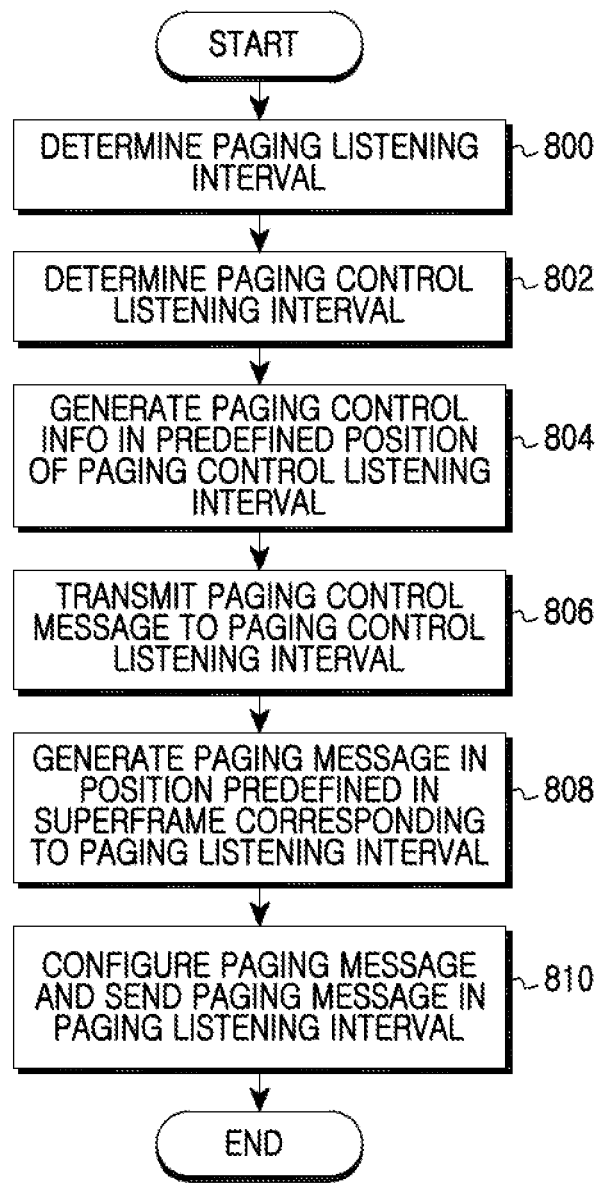
FIG. 8 is a flowchart illustrating an operation of a BS according to an exemplary embodiment of the present invention.

FIG. 8 is a flow diagram illustrating an operation of a BS according to an exemplary embodiment of the present invention.

Referring to FIG. 8, in step 800, the BS determines the paging listening interval 720 in which a plurality of MSs awake from an idle mode and receive paging messages 727 to 729. In step 802, according to the frame structure of FIG. 7, the BS determines the paging control listening interval 710 based on the determined paging listening interval 720. In another realization, the BS may determine the paging control listening interval 710 using the paging cycle and the paging offset, and determine the paging listening interval 720 from a defined frame (i.e., 2 frames) subsequent to the paging control listening interval 710.

In step 804, the BS generates a paging control message to be transmitted in a predefined position of the paging control listening interval 710. In step 806, the BS transmits the paging control information in the predefined position of the paging control listening interval 710. Here, a method for transmitting the paging control message accords to one of the various exemplary embodiments of FIG. 2, and is different from transmitting of the paging control information of FIG. 2 in that the paging control information is transmitted not in a superframe corresponding to the paging listening interval 720 but in a superframe corresponding to the paging control listening interval 710.

In step 808, the BS generates paging information in the position or region predefined in the superframe corresponding to the determined paging listening interval 720. The predefined position or region corresponds to a frame, which is predefined such that the idle mode MS receives a paging message.

In step 810, the BS configures the paging message including the paging information and transmits the paging message in the paging listening interval 720.

After that, the BS terminates the procedure according to the exemplary embodiment of the present invention.

Figure 9:
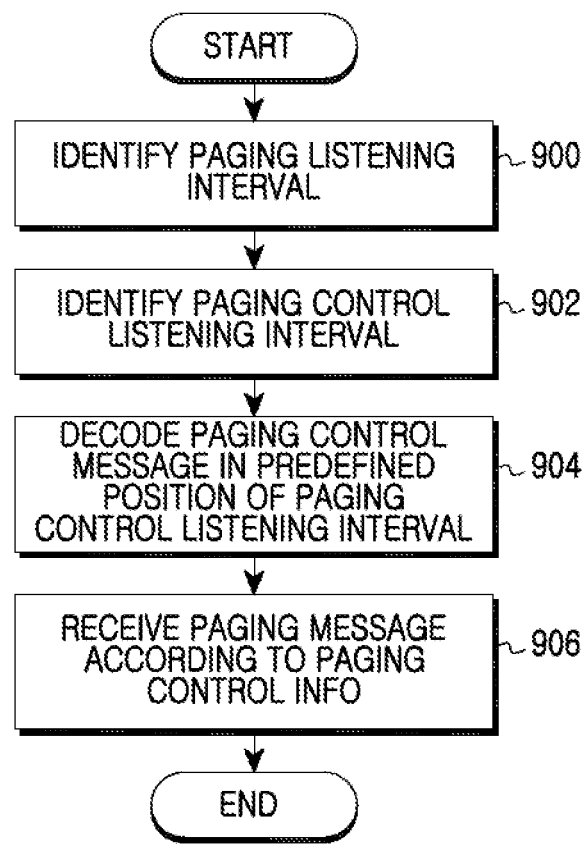
FIG. 9 is a flowchart illustrating an operation of an MS according to an exemplary embodiment of the present invention.

FIG. 9 is a flow diagram illustrating an operation of an idle mode MS according to an exemplary embodiment of the present invention.

Referring to FIG. 9, in step 900, upon idle mode entry, the MS identifies the paging listening interval 720 based on paging cycle and paging offset information negotiated with a BS.

In step 902, the MS identifies the paging control listening interval 710, which is predefined on the basis of the paging listening interval 720. In step 904, the MS decodes a paging control message in a predefined position of the paging control listening interval 710.

In another realization, the paging control listening interval 710 can be determined using the paging cycle and paging offset, and the paging listening interval 720 can be determined from a defined frame subsequent to the paging control listening interval 710.

An operation of reading out the paging control information accords to one of the various exemplary embodiments of FIG. 2. In FIG. 2, the paging control information is transmitted in a superframe corresponding to the paging listening interval 720. The operation of FIG. 9 is different from that of FIG. 8 only in that the paging control information is transmitted in the paging listening interval 720.

In step 906, according to the read paging control information, the MS receives a paging message in the paging listening interval 720. At this time, a frequency band in which the MS receives the paging control information can be different from a frequency band in which the MS receives the paging message. So, the MS has to perform an operation of converting the frequency band in which the MS has received the paging control information into the frequency band in which the MS will receive the paging message.

Next, the MS terminates the procedure according to the exemplary embodiment of the present invention.

As described above, an exemplary embodiment of the present invention can efficiently transmit paging control information through a separate SFH, by configuring the paging control information in a predefined region of a superframe corresponding to a paging listening interval and transmitting the paging control information in a superframe-based wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Base Station (BS) for paging in a superframe-based wireless communication system, the method comprising:
   determining a paging listening interval;
   determining an interval of at least one or more subframes before the paging listening interval, as a paging control listening interval; and
   during the paging control listening interval, broadcasting a paging control message,
   wherein, if a frequency band for broadcasting the paging control message is different from a frequency band for broadcasting the paging message, the paging control listening interval is determined considering a time of switching between the two frequency bands.

2. The method of claim 1, wherein the paging control message comprises at least one or more of a number of paging group IDentifiers (IDs), a paging group ID, and a paging indicator indicating transmission or non-transmission of a paging message for a plurality of Mobile Stations (MSs) included in a paging group.

3. The method of claim 1, wherein the paging listening interval is determined as an interval of at least one or more superframes.

4. The method of claim 1, further comprising broadcasting a paging message during the paging listening interval.

5. The method of claim 1, wherein the paging control listening interval is determined considering at least one or more of a time for an MS of an idle mode to process the paging control message and process a paging message of the paging listening interval according to the paging control message.

6. The method of claim 1, wherein the paging listening interval is determined using a paging cycle and a paging offset.

7. A method of operating a Mobile Station (MS) for paging in a superframe-based wireless communication system, the method comprising:
   determining a paging listening interval;
   determining an interval of at least one or more subframes before the paging listening interval, as a paging control listening interval; and
   during the paging control listening interval, receiving a paging control message,
   wherein, if a frequency band for broadcasting the paging control message is different from a frequency band for broadcasting the paging message, the paging control listening interval is determined considering a time of switching between the two frequency bands.

8. The method of claim 7, wherein the paging control message comprises at least one or more of a number of paging group IDentifiers (IDs), a paging group ID, and a paging indicator indicating transmission or non-transmission of a paging message for a plurality of Mobile Stations (MSs) included in a paging group.

9. The method of claim 7, wherein the paging listening interval is determined as an interval of at least one or more superframes.

10. The method of claim 7, further comprising receiving a paging message during the paging listening interval.

11. The method of claim 7, wherein the paging control listening interval is determined considering at least one or more of a time for an MS of an idle mode to process the paging control message and process a paging message of the paging listening interval according to the paging control message.

12. The method of claim 7, wherein the paging listening interval is determined using a paging cycle and a paging offset.

13. A Base Station (BS) apparatus for paging in a superframe-based wireless communication system, the apparatus comprising:
   a controller for determining a paging listening interval, and for determining an interval of at least one or more subframes before the paging listening interval, as a paging control listening interval; and
   a transmitter for, during the paging control listening interval, broadcasting a paging control message,
   wherein, if a frequency band for broadcasting the paging control message is different from a frequency band for broadcasting the paging message, the paging control listening interval is determined considering a time of switching between the two frequency bands.

14. The apparatus of claim 13, wherein the paging control message comprises at least one or more of a number of paging group IDentifiers (IDs), a paging group ID, and a paging indicator indicating transmission or non-transmission of a paging message for a plurality of Mobile Stations (MSs) included in a paging group.

15. The apparatus of claim 13, wherein the paging listening interval is determined as an interval of at least one or more superframes.

16. The apparatus of claim 13, wherein the transmitter broadcasts a paging message during the paging listening interval.

17. The apparatus of claim 13, wherein the paging control listening interval is determined considering at least one or more of a time for an MS of an idle mode to process the paging control message and process a paging message of the paging listening interval according to the paging control message.

18. The apparatus of claim 13, wherein the paging listening interval is determined using a paging cycle and a paging offset.

19. A Mobile Station (MS) apparatus for paging in a superframe-based wireless communication system, the apparatus comprising:
   a controller for determining a paging listening interval, and for determining an interval of at least one or more subframes before the paging listening interval, as a paging control listening interval; and
   a receiver for, during the paging control listening interval, receiving a paging control message,
   wherein, if a frequency band for broadcasting the paging control message is different from a frequency band for broadcasting the paging message, the paging control listening interval is determined considering a time of switching between the two frequency bands.

20. The apparatus of claim 19, wherein the paging control message comprises at least one or more of a number of paging group IDentifiers (IDs), a paging group ID, and a paging indicator indicating transmission or non-transmission of a paging message for a plurality of Mobile Stations (MSs) included in a paging group.

21. The apparatus of claim 19, wherein the paging listening interval is determined as an interval of at least one or more superframes.

22. The apparatus of claim 19, wherein the receiver receives a paging message during the paging listening interval.

23. The apparatus of claim 19, wherein the paging control listening interval is determined considering at least one or more of a time for an MS of an idle mode to process the paging control message and process a paging message of the paging listening interval according to the paging control message.

24. The apparatus of claim 19, wherein the paging listening interval is determined using a paging cycle and a paging offset.

25. A method of operating a Base Station (BS) for paging in a superframe-based wireless communication system, the method comprising:
    determining a paging listening interval;
    determining at least one subframe in a region predefined in a superframe corresponding to the paging listening interval, as a paging control listening interval; and
    broadcasting the paging control message in the paging control listening interval,
    wherein, if a frequency band for broadcasting the paging control message is different from a frequency band for broadcasting the paging message, the paging control listening interval is determined considering a time of switching between the two frequency bands.

26. The method of claim 25, wherein determining of the at least one subframe predefined in a superframe corresponding to the paging listening interval, as a paging control listening interval comprises generating the paging control message after a SuperFrame Header (SFH) and a burst allocation information region, transmitted in a first subframe of the superframe corresponding to the paging listening interval.

27. The method of claim 26, wherein the SFH comprises an indicator for indicating transmission of the paging control message.

28. The method of claim 25, wherein determining of the at least one subframe predefined in a superframe corresponding to the paging listening interval, as a paging control listening interval comprises generating the paging control message within burst allocation information after the SFH transmitted in the first subframe of the superframe corresponding to the listening interval.

29. The method of claim 25, wherein the paging control message comprises at least one or more of a number of paging group IDentifiers (IDs), a paging group ID, and a paging indicator.

30. The method of claim 25, further comprising transmitting a paging message from a second subframe of the superframe corresponding to the paging listening interval.

31. A method of operating a Mobile Station (MS) for paging in a superframe-based wireless communication system, the method comprising:
    determining a paging listening interval; and
    receiving paging control information in at least one subframe predefined in a superframe corresponding to the paging listening interval,
    wherein, if a frequency band for broadcasting the paging control message is different from a frequency band for broadcasting the paging message, the paging control listening interval is determined considering a time of switching between the two frequency bands.

32. The method of claim 31, wherein the receiving of the paging control information in the at least one subframe predefined in the superframe corresponding to the paging listening interval comprises receiving the paging control information after a SuperFrame Header (SFH) and a burst allocation information region, transmitted in a first subframe of the superframe corresponding to the paging listening interval.

33. The method of claim 32, wherein the SFH comprises an indicator for indicating transmission of the paging control information.

34. The method of claim 31, wherein the receiving of the paging control information in the at least one subframe predefined in the superframe corresponding to the paging listening interval comprises receiving the paging control information within burst allocation information after the SFH transmitted in the first subframe of the superframe corresponding to the paging listening interval.

35. The method of claim 31, wherein the paging control information comprises at least one or more of a number of paging group IDentifiers (IDs), a paging group ID, and a paging indicator.

36. The method of claim 31, further comprising receiving a paging message from a second subframe of the superframe corresponding to the paging listening interval.

* * * * *